US008812664B2

(12) United States Patent
Larkin et al.

(10) Patent No.: US 8,812,664 B2
(45) Date of Patent: Aug. 19, 2014

(54) CONTROLLING AN APPARATUS

(75) Inventors: Nicholas Peter Larkin, Enfield (GB); Alastair Mitchell, Enfield (GB); Andy Tylee, Enfield (GB); Colin Tregenza Dancer, Enfield (GB); Steven Kennedy, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 107 days.

(21) Appl. No.: 13/546,554

(22) Filed: Jul. 11, 2012

(65) Prior Publication Data

US 2013/0185416 A1  Jul. 18, 2013

(30) Foreign Application Priority Data

Jul. 11, 2011 (GB) .................................. 1111859.3

(51) Int. Cl.
 *G06F 15/173* (2006.01)
 *G06F 11/00* (2006.01)
 *H04L 12/28* (2006.01)

(52) U.S. Cl.
 USPC ............ 709/224; 370/219; 370/254; 370/389

(58) Field of Classification Search
 None
 See application file for complete search history.

(56) References Cited

U.S. PATENT DOCUMENTS

| | | | | |
|---|---|---|---|---|
| 5,473,599 | A * | 12/1995 | Li et al. .......................... | 370/219 |
| 7,554,994 | B1 * | 6/2009 | Puon et al. ..................... | 370/401 |
| 8,077,709 | B2 * | 12/2011 | Cai et al. ........................ | 370/389 |
| 2004/0032868 | A1 * | 2/2004 | Oda et al. ....................... | 370/389 |
| 2012/0014260 | A1 * | 1/2012 | Enomoto ..................... | 370/241.1 |
| 2012/0076048 | A1 * | 3/2012 | Kanekar et al. .............. | 370/254 |

FOREIGN PATENT DOCUMENTS

| | | |
|---|---|---|
| WO | 2004010653 A1 | 1/2004 |
| WO | 2006041957 A1 | 4/2006 |

OTHER PUBLICATIONS

"Linux Ethernet Bonding Driver HOWTO"; http://www.cyberciti.biz/howto/question/static/linux-ethernet-bonding-driver-howto.php; Jun. 21, 2005.

\* cited by examiner

*Primary Examiner* — Wen-Tai Lin
(74) *Attorney, Agent, or Firm* — EIP US LLP (57) ABSTRACT

An apparatus in a LAN has first and second hardware interfaces to connect to the LAN. First and second monitoring request messages are transmitted to one or more devices in a first VLAN and one or more devices in a second VLAN respectively, via both the first and second hardware interfaces. The monitoring request messages use the Address Resolution Protocol (ARP) or the Neighbor Discovery Protocol (NDP). First and second monitoring response messages are received via the first and/or second hardware interfaces in response to the first and second monitoring request messages respectively. A selection is made between the first and second hardware interfaces for performing data communication, based on the first and second monitoring response messages. The selection is performed independently for data communication via the first and second VLANs based on at least one characteristic of the first and second monitoring response messages respectively.

13 Claims, 3 Drawing Sheets

CONTROLLING AN APPARATUS

CROSS-REFERENCE TO RELATED APPLICATIONS

This application claims priority to foreign Patent Application No. GB 1111859.3, filed on Jul. 11, 2011, the disclosure of which is incorporated herein by reference in its entirety.

FIELD OF THE INVENTION

The present invention relates to an apparatus, a method for controlling an apparatus, a computer program and a computer program product.

BACKGROUND OF THE INVENTION

Computer networks that facilitate data communication between computing devices via a network of communications channels can suffer from faults or other forms of connectivity degradation. Such degradation can have a significant impact upon network performance and user experience.

Fault detection in a Local Area Network (LAN) can be conducted using the Internet Control Message Protocol (ICMP). An ICMP Echo Request, also known as an ICMP Ping, is a request-response message that is directed to a given IP address. ICMP Pings provide additional functionality added on top of the fundamental networking commands within a LAN, and can be used to probe devices associated with given IP addresses for connectivity problems or other responsiveness problems (for example, if a device is not responsive, it may be down or experiencing internal difficulties in processing or responding to ICMP Ping requests, which may be indicative of difficulties in processing or responding to other requests).

A fault-tolerant host in a LAN can include a so-called "redundant connection" to the LAN that comprises two Ethernet adaptors for connection to the LAN; a main adaptor that is used as a default connection to the LAN and a second adaptor to which the host can "failover" should connectivity degradation occur in relation to the first adaptor. Following the failover, the host communicates in the LAN using the second adaptor. If the LAN supports one or more Virtual LANs (VLANs) and the host is configured to participate in several different VLANs by specifying an Institute of Electrical and Electronics Engineers (IEEE) 802.1Q VLAN tag on its Ethernet frames, the host can failover all of its traffic, including all of the traffic on each VLAN, to the second adaptor.

Although this provides some level of fault tolerance in a LAN supporting one or more VLANs, it would be desirable to provide improved fault-tolerant methods and apparatuses, in particular that provide additional control in relation handling faults in the LAN.

SUMMARY OF THE INVENTION

In a first exemplary embodiment of the invention, there is provided a method of controlling an apparatus in a local area network (LAN), the apparatus having a first hardware interface and a second hardware interface to connect to the LAN, the method comprising: transmitting first monitoring request messages to one or more devices in a first virtual local area network (VLAN) via both the first and second hardware interfaces and second monitoring request messages to one or more devices in a second VLAN via both the first and second hardware interfaces, wherein the first and second monitoring request messages use the Address Resolution Protocol (ARP) or the Neighbor Discovery Protocol (NDP); receiving first monitoring response messages via the first and/or second hardware interfaces in response to the first monitoring request messages and second monitoring response messages via the first and/or second hardware interfaces in response to the second monitoring request messages; selecting between the first and second hardware interfaces for performing data communication, based on the first and second monitoring response messages, wherein the selecting between the first and second interfaces is performed independently for data communication via the first VLAN based on at least one characteristic of the first monitoring response messages and for data communication via the second VLAN based at least one characteristic of the second monitoring response messages.

Hence, the first and second VLANs can be failed over, or otherwise selected between, independently, where necessary, so that one VLAN can use one of the hardware interfaces for connection to the LAN and the other VLAN can use the other of the hardware interfaces connection to the LAN.

The use of ARP or NDP supports relatively fast and reliable fault detection in the LAN, as compared to, for example, ICMP Ping messages, which tend to be treated as low-priority messages by IP routers and hosts which are at the edge of the LAN. Furthermore, ARP and NDP are relatively low overhead, i.e. resource usage, within the LAN. This provides for improved scalability, allowing the techniques described herein to be used with a relatively high frequency of monitoring, even where a large number of VLANs are set up within a LAN.

In some embodiments, at least some of the first and second monitoring request messages and at least some of the first and second monitoring response messages use the ARP. Being part of the basic framework for Internet Protocol (IP) communications in a LAN supporting communications based on the Internet Protocol version 4 (IPv4), ARP messages are handled with relatively high priority compared to ICMP Ping messages, and use a relatively low overhead, even if sent with relatively high frequency. This provides relatively fast and reliable fault detection in IPv4 networks In some embodiments, at least some of the first and second monitoring request messages and at least some of the first and second monitoring response messages use the NDP. Being part of the basic framework for Internet Protocol (IP) communications in a LAN supporting communications based on the Internet Protocol version 6 (IPv6), NDP messages are handled with relatively high priority compared to ICMP Ping messages, and use a relatively low overhead, even if sent with relatively high frequency. This provides relatively fast and reliable fault detection in IPv6 networks.

In some embodiments, at least some of the first and second monitoring request messages are unicast messages. A unicast ARP or NDP message may be transmitted to a specific node in the network that is likely to respond to the ARP or NDP message so that an efficient, quick and reliable, determination as to connectivity in the LAN can be made, with relatively low overhead.

In some embodiments, at least some of the first and second monitoring request messages are transmitted to at least one common device. In some embodiments, the at least one common device comprises a default router for the LAN. This may provide more reliable fault detection as the default router is likely to be an active node in the LAN, routinely responding to ARP or NDP messages.

In some embodiments, the first hardware interface is configured with a first Media Access Control (MAC) address, the second hardware interface is configured with a second, different MAC address, and the first and second hardware interfaces are collectively associated with a third MAC address different from both the first and second MAC addresses, and wherein the method comprises transmitting monitoring request messages, and receiving monitoring reply messages, using the first and second MAC addresses for both the first and second VLANs, and performing data communication using the third MAC address for each of the first and second VLANs. In such embodiments, the monitoring request and response messages can be addressed to the hardware interface from which they were transmitted. Data communication can be addressed to the third MAC address which can be assigned to one of the hardware interfaces on a per-VLAN basis so that data can be communicated via a given hardware interface for that VLAN using the third MAC address, without having to inform nodes in the LAN that the first or second MAC address should be used in the event of a failover or other reason for selecting between the different hardware interfaces.

In some embodiments, whilst conducting data communication via at least one of the first and second VLANs using the first hardware interface, it is determined that the second hardware interface is more reliable than the first hardware interface for data communication via the at least one of the first and second VLANs, and the method further comprises transmitting an announcement message via the second hardware interface announcing that the third MAC address is reachable via the second hardware interface and no longer via the first hardware interface for data communication via the at least one of the first and second VLANs. Nodes in the LAN can thereby be informed that communication with the at least one of the first and second VLANs should take place using the second hardware interface so that data can be routed to the hardware interface associated with the most reliable connection to the LAN on a per-VLAN basis.

In some embodiments, a third VLAN shares the same topology in the local area network as the first VLAN, and the method comprises sending shared monitoring request messages and receiving shared monitoring response messages, on behalf of both the first VLAN and the third VLAN, and selecting between the first and second interfaces commonly for data communication via the first VLAN and data communication via the third VLAN, based on the shared response messages. VLANs sharing the same topology in the LAN can be probed and failed over, or otherwise switched between physical interfaces, collectively without having to perform fault detection for each of the VLANs separately. This can lead to quicker fault detection with less data, as a result of fewer monitoring request and response messages, being transmitted in the LAN to perform the fault detection.

Some embodiments comprise determining whether the first hardware interface is more reliable than the second hardware interface for communications on the first and second VLANs based on the first and second monitoring response messages, and performing the selecting on the basis of the determining. The current most reliable hardware interface can thereby be selected on a per-VLAN basis.

In a second exemplary embodiment of the invention, there is provided a computer program product comprising a non-transitory computer-readable storage medium having computer readable instructions stored thereon, the computer readable instructions being executable by a computerized device to cause the computerized device to perform a method for controlling an apparatus in a local area network (LAN), the apparatus having a first hardware interface and a second hardware interface to connect to the LAN, the method comprising transmitting first monitoring request messages to one or more devices in a first virtual local area network (VLAN) via both the first and second hardware interfaces, and second monitoring request messages to one or more devices in a second VLAN via both the first and second hardware interfaces, wherein the first and second monitoring request messages use the Address Resolution Protocol (ARP) or the Neighbor Discovery Protocol (NDP), receiving first monitoring response messages via the first and/or second hardware interfaces in response to the first monitoring request messages and second monitoring response messages via the first and/or second hardware interfaces in response to the second monitoring request messages, selecting between the first and second hardware interfaces for performing data communication, based on the first and second monitoring response messages, wherein the selecting between the first and second interfaces is performed independently for data communication via the first VLAN based on at least one characteristic of the first monitoring response messages and for data communication via the second VLAN based at least one characteristic of the second monitoring response messages.

In a third exemplary embodiment of the invention, there is provided apparatus comprising a first hardware interface and a second hardware interface to connect to a Local Area Network (LAN) and being configured to transmit first monitoring request messages to one or more devices in a first virtual local area network (VLAN) via both the first and second hardware interfaces, and second monitoring request messages to one or more devices in a second VLAN via both the first and second hardware interfaces, wherein the first and second monitoring request messages use the Address Resolution Protocol (ARP) or the Neighbor Discovery Protocol (NDP), receive first monitoring response messages via the first and/or second hardware interfaces in response to the first monitoring request messages and second monitoring response messages via the first and/or second hardware interfaces in response to the second monitoring request messages, select between the first and second hardware interfaces for performing data communication, based on the first and second monitoring response messages, wherein the selecting between the first and second interfaces is performed independently for data communication via the first VLAN based on at least one characteristic of the first monitoring response messages and for data communication via the second VLAN based at least one characteristic of the second monitoring response messages. In some embodiments, the apparatus comprises a media gateway. In some embodiments, the apparatus comprises a session border controller.

Further features and advantages of various embodiments will become apparent from the following description of embodiments, given by way of example only, which is made with reference to the accompanying drawings.

DETAILED DESCRIPTION

Figure 1:
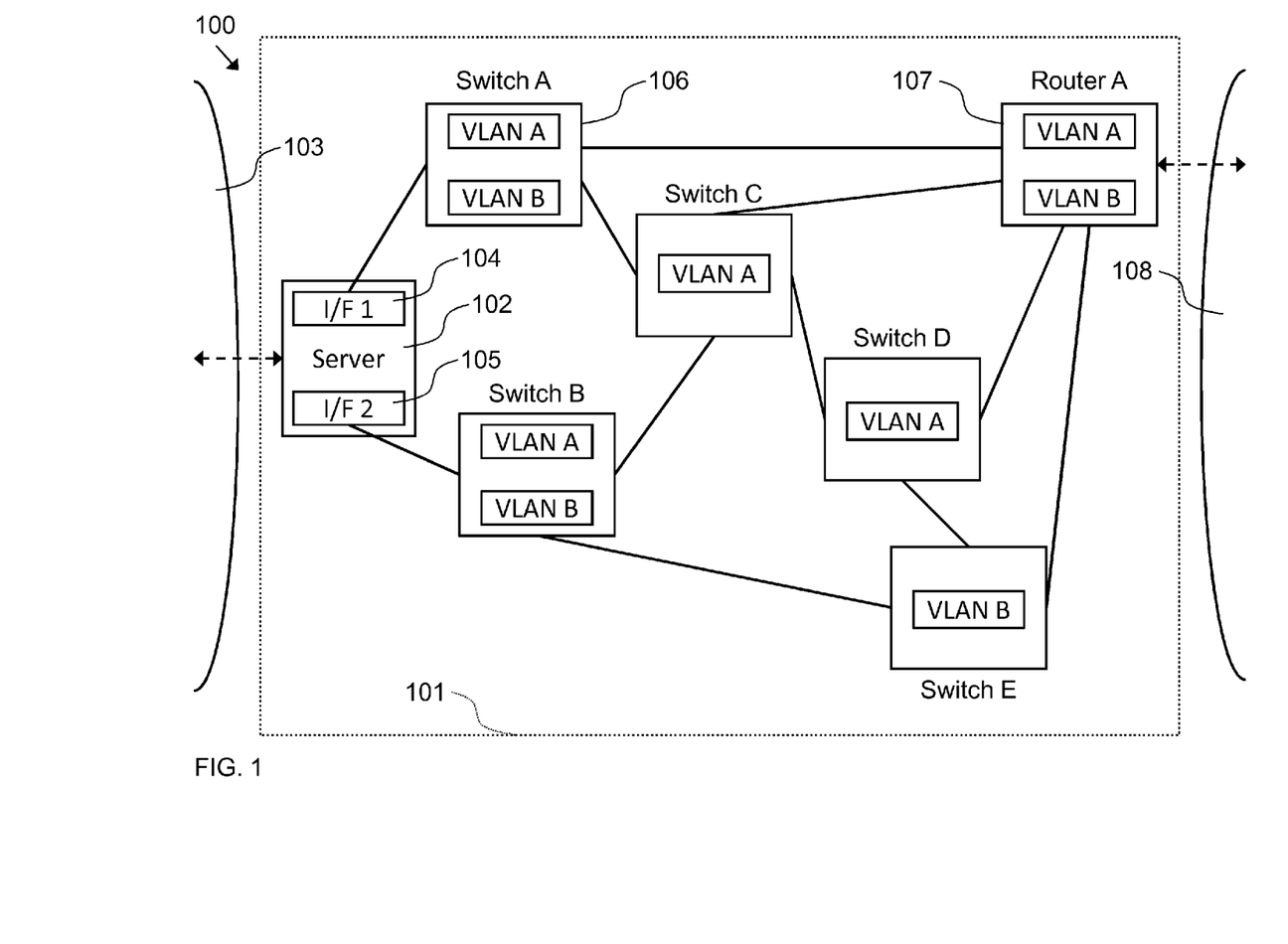
FIG. 1 is a schematic system diagram showing a network including a local area network according to some embodiments.

FIG. 1 shows a network 100 including a local area network (LAN) 101.

A LAN 101 is a computer network that connects together various entities in a limited geographic area via shared network nodes and connections. The devices within the LAN 101 may be interconnected by means of physical and/or wireless connections, for example by means Ethernet cables or wireless connections in accordance with the Institute of Electrical and Electronics Engineers (IEEE) 802.11 standard.

The LAN 101 includes server 102 that provides services in the LAN 101. In some embodiments, the server 102 comprises a media gateway which converts media data streams between different telecommunications networks, including the LAN 101 and another network 103. In such embodiments, the media gateway may be controlled by a media gateway controller (not shown). In some embodiments, the server 102 may comprise a Session Border Controller (SBC) in a Voice over IP (VoIP) network that can control signalling and media data. The server 102 comprises at least one processor and at least one memory including computer program code.

The server 102 includes one or more physical connections to the LAN 101 including first and second hardware interfaces 104, 105. The first and second hardware interfaces 104, 105 may comprise a primary interface and a backup interface that can be used should a fault develop in relation to the primary interface.

Each of the network interfaces is assigned a unique hardware identifier for communications within the LAN 101. The unique hardware identifier may be a Media Access Control (MAC) address that is typically permanently assigned by the manufacturer of the interface 104, 105. In such cases, the MAC addresses are commonly referred to as "burned-in". In this case, the MAC address of the primary interface 104 is different from the MAC address of the backup interface 105 so that each of the interfaces 104, 105 can be uniquely identified and addressed in the LAN 101. In addition to the burned-in MAC addresses associated with the primary and backup hardware interfaces 104, 105, the server 102 is assigned a third MAC address, referred to herein as a "floating" MAC address. The floating MAC address can be assigned to, or owned by, either the primary or the backup hardware interface 104, 105.

The LAN 101 includes switching hardware, referred to generally by reference 106, that forwards data packets within the LAN 101. In some embodiments, the switching hardware 106 comprises a plurality of multi-port network switches 106, five of which are shown in FIG. 1 as switches A through E. Each switch 106 includes a number of ports by means of which it can communicate with other devices in the LAN 101. The switches each maintain a MAC address table that stores a MAC address associated with another device in the LAN 101 against a port ID identifying which of the switch's ports should be used to communicate with the device having that MAC address.

The switch 106 populates the MAC address table with a MAC address of a device from which it receives a message and stores this against the port on which it received the message from that device so that it can determine which port to use to communicate with that device in the future.

Messages in the LAN 101 can be unicast to a given device by addressing the message to the MAC address associated with the given device. The message can then be routed within the LAN 101 to the given device according to the MAC address tables. Messages also can be broadcast within the LAN 101 by setting the destination address of the broadcast message to a broadcast MAC address. Switching hardware 106 in the LAN 101 detecting the broadcast MAC address forwards the message out of all of its other ports.

The LAN 101 includes routing hardware 107 that forwards data packets between the LAN 101 and other networks, such as an Internet Protocol (IP) network 108. In some embodiments, the routing hardware 107 comprises one or more routers and/or one or more gateways. FIG. 1 shows a single router, labelled as "Router A", which is a default router that serves as a default point of access to the IP network 108.

In some cases, several different entities may wish to use the resources of the LAN 101. In such cases, it may be desirable to provide virtual or logical separation of data associated with each of the different entities, for example for the purpose of data security. For example, an enterprise may wish to create separation of data from one of its departments from that of another department on a single physical LAN 101 infrastructure rather that providing a separate physical LAN for each department.

The LAN 101 in some embodiments supports one or more Virtual LANs (VLANs) which can be used to share resources in the LAN 101 amongst the different entities by creating a new broadcast domain for each VLAN. Data that is broadcast in a given VLAN is sent to all devices belonging to that given VLAN, which may not be the full set of devices in the LAN 101. Data that is unicast within the VLAN is constrained to paths within that VLAN. The server 102 is configured to participate in several different VLANs, for example by specifying an Institute of Electrical and Electronics Engineers (IEEE) 802.1Q VLAN tag on its Ethernet frames.

As shown in FIG. 1, two VLANs, VLAN A and VLAN B, coexist on the LAN 101 and each has access to a subset of all of the devices in the LAN 101.

The devices in the LAN 101 may be interconnected to each other by means of physical trunking connections that support traffic from several VLANs over one physical connection. The traffic associated with each of the different VLANs is identifiable and distinguishable from traffic associated with other VLANs using the same trunk by including a VLAN identifier or "VLAN tag" in the traffic. In such cases, the total bandwidth of the physical connection is shared between all of the different VLANs using the physical connection.

When a switch 106 receives a unicast message including a VLAN tag and a destination MAC address for the unicast message, it looks up the port associated with that destination MAC address and the VLAN tag in its MAC address table and forwards the message on that port. When a switch 106 receives a broadcast message including a VLAN tag, it identifies all ports associated with the VLAN tag and forwards the message on those ports.

A device, such as the server 102, having network interfaces, such as the primary and backup interfaces 104, 105, that support virtual interfaces, can instantiate a virtual interface for each VLAN. The virtual interface acts as, and is associated with, the physical hardware interfaces 104, 105. When the server 102 receives a message including a VLAN tag via the primary or backup interface 104, 105, it identifies a virtual interface associated with that VLAN tag and passes that message to the appropriate virtual interface.

In some cases, such as is shown in FIG. 1, there are several different VLAN topologies instantiated on a single physical LAN 101 infrastructure. For example, VLAN A has access to switch C, whereas VLAN B does not. VLAN B has access to Switch E, whereas VLAN A does not. As such, different VLANs can contain different subsets of all of the device of, and connections in, the LAN 101. Furthermore, since a switch may be associated with several VLANs, it maintains an independent MAC address table for each VLAN or a MAC address table that specifies which port should be used to route to a given destination MAC address for a particular VLAN. As such, a switch may use one port to route traffic to a given MAC address for one VLAN and a different port to route traffic to the given MAC address for another VLAN.

In the event of a failure or other connectivity degradation in the LAN 101, it can be beneficial for the server 102 to use one of its hardware interfaces 104, 105 to reach one set of VLANs and the other hardware interface 104, 105 to reach the other set of VLANs.

IP-capable devices, including physical and virtual interfaces, in the LAN 101 may be assigned an IP addresses so that they can communicate with other IP-capable devices in accordance with the Internet Protocol.

In some cases, a device in the LAN 101 may know the IP address of a device with which it wishes to communicate, but may not be aware of the corresponding MAC address of that device which it needs to communicate with that device within the LAN 101. In such cases, the IP address can be resolved into an associated MAC address. One way in which such address resolution can be achieved is by using the Address Resolution Protocol (ARP). ARP is an address resolution protocol that controls the mapping between Internet Protocol version 4 (IPv4) addresses and MAC addresses. The Neighbor Discover Protocol (NDP) provides address resolution in the case of Internet Protocol version 6 (IPv6) addresses. ARP and NDP resolve Open Systems Interconnection OSI Layer 3 (network layer) addresses into OSI Layer 2 (data link layer) addresses.

Although ARP messages are used for address resolution, they can also be used as monitoring request messages to probe the LAN 101 for faults. In particular, the server 102 can use ARP messages as monitoring messages to probe the LAN 101 to detect faults or other connectivity degradation within the LAN 101.

To perform such probing, the server 102 determines the IP address of a target device within the LAN 101. In some embodiments, the target device is the default router, router A, which may be a single physical device serving multiple VLANs. The server 102 first broadcasts a monitoring request message in the form of an ARP request message to query which device in the LAN 101 has been assigned that particular IP address. The ARP request message contains the queried IP address and the broadcast MAC address, and also includes the MAC and IP addresses of the network interface that broadcasted the ARP message.

ARP messages are broadcast on both the primary and backup hardware interfaces 104, 105. ARP messages sent via the primary interface 104 include the burned-in MAC address associated with the primary interface 104 and ARP messages sent via the backup interface 105 includes the burned-in MAC address associated with the backup interface 105. Responses to the ARP messages sent on the primary interface 104 are addressed to the burned-in MAC address associated with the primary interface 104 and are received via the primary interface 104. Responses to the ARP messages sent on the backup interface 105 are addressed to the burned-in MAC address associated with the backup interface 105 and are received via the backup interface 105.

The target device in the LAN 101 that currently owns the queried IP address receives the ARP request message, identifies the queried IP address in the ARP request message and responds with a monitoring response message in the form of an ARP response message directed back to the server 102. The response message asserts the target device's ownership of the queried IP address. The ARP response message includes the MAC address of the target device that owns the queried IP address.

As the ARP response message traverses the LAN 101 on the way back to the server 102, any switching hardware 106 that encounters the ARP response message updates its MAC tables to reflect which of its ports it should use to reach the target device for subsequent communications directed to the MAC address of the target device.

Once the server 102 has received the ARP response message that associates the queried IP address with the MAC address of the target device, the server 102 stores the association in an ARP cache; a table that stores MAC-IP address associations, so that it can use the association subsequently.

The server 102 can then subsequently direct unicast ARP request messages to the MAC address of the target device by retrieving that MAC address from the ARP cache to confirm that the target device still has ownership of the queried IP address.

In some cases, a fault or other degradation may occur in the LAN 101. In such cases, it is desirable to determine that the fault has occurred as quickly and reliably as possible.

ARP messages can be used as monitoring messages for probing the LAN 101 for faults in a more efficient manner than an ICMP Ping message because they are required to enable proper routing of traffic within the LAN and use a relatively low overhead even if they are sent with relatively high frequency. As such, ARP messages are treated with higher priority than ICMP Ping messages by LAN devices. In some cases, certain devices in and outside the LAN 101 may even be configured to discard ICMP Ping request for security or other purposes. The ARP messages may be sent periodically, for example every 1 to 100 milliseconds, such as around every 10 milliseconds, so that any faults in the LAN 101 can be detected quickly and switching between hardware interfaces can be handled efficiently so that there is minimal disruption to service in the LAN 101.

The server 102 can select between the primary and backup interfaces 104, 105 based on at least one characteristic of any ARP response messages it receives. Suitable characteristics can include, but are not limited to being, whether the messages are received within a predetermined timeout period, a round-trip time associated with the ARP request-response messages and the like. As such, the server 102 can determine a preferred interface (for example the most reliable) of the primary and backup interfaces 104, 105 and use that interface 104, 105 for data communication on the LAN 101. The sever 102 can select an interface on a per-VLAN basis independently for each VLAN.

In contrast to using the permanent (so-called "burned-in") MAC addresses for the monitoring request and response messages, a dynamic (so-called "floating") MAC address is used for all data traffic (as opposed to monitoring messages), and is used to prevent the monitoring messages from each interface from interfering with the ongoing routing of data traffic.

Figure 2:
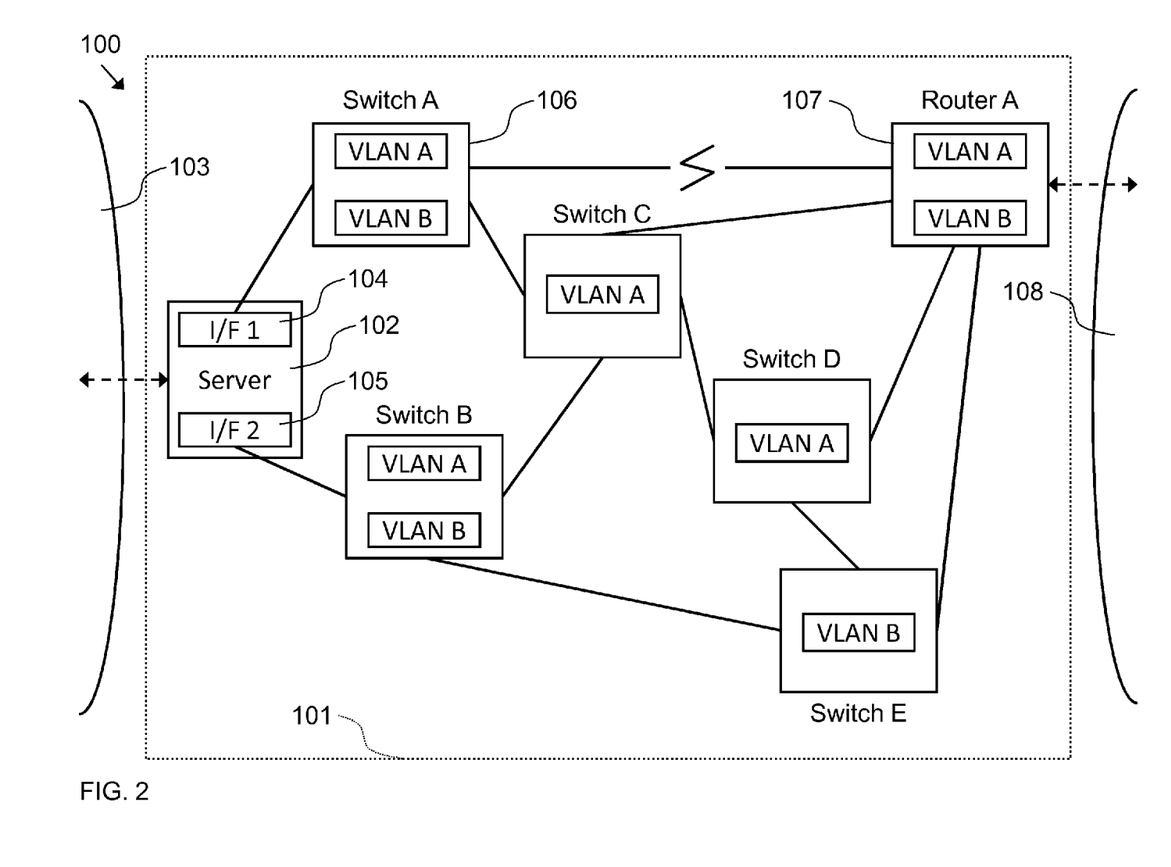
FIG. 2 is a schematic system diagram showing a network including a local area network according to some embodiments.

FIG. 2 shows a schematic representation of a network 100 according to some embodiments.

In the absence of a fault in the network 100, the pre-fault route for monitoring messages from the primary hardware interface 104 to the router A is via switch A for both VLAN A and VLAN B.

In FIG. 2, a fault has occurred between switch A associated with VLAN A and VLAN B and the default router, router A, which is also associated with VLAN A and VLAN B.

The server 102 periodically transmits ARP messages to router A via the primary and backup interfaces 104, 105 to probe the LAN 101. In this case, the probing is on a per-VLAN basis in the sense that the LAN 101 is probed on VLAN A and separately on VLAN B.

The virtual interface associated with VLAN A transmits ARP messages to router A via both the primary and backup hardware interfaces 104, 105. Even though there is a fault between the server 102 and router A, the ARP request message transmitted via the primary interface 104 can still be forwarded to router A via switches A and C and an ARP response message is received via the same route at the primary interface 104. Similarly, the ARP message transmitted via the backup interface 105 can still be forwarded to router A via switches B and C and an ARP response message is received via the same route at the backup interface 105.

The virtual interface associated with VLAN B also transmits ARP messages to router A via both the primary and backup hardware interfaces 104, 105. However, in this case, because of the fault, the ARP messages transmitted via the primary interface 104 cannot be routed to router A. This is because the only other switch, switch C, to which switch A is connected is on VLAN A and not VLAN B. The ARP message transmitted via the backup interface 105 can, however, still be forwarded to router A via switches B and E and an ARP response message is received via the same route at the backup interface 105.

In this case, the server 102 decides to failover on VLAN B from the primary interface 104 to the backup interface 105. This decision is made independently of whether or not the server 102 decides to failover VLAN A. The server 102 determines whether the primary or backup interface 104, 105 currently owns the floating MAC address in relation to VLAN B. Since the server 102 detected a loss of connectivity on the primary interface 104 on VLAN B, the server 102 switches the floating MAC address to the backup interface 105 by sending a promotion announcement comprising a short sequence of broadcast packets via the backup interface 105 from the floating MAC address on VLAN B. The promotion announcement is broadcast to all devices in the broadcast domain of VLAN B which reconfigures the devices to route traffic for the floating MAC address to the backup interface 105, from which the promotion announcement was broadcast, instead of the primary interface 104. As such, if the server 102 decides to perform a failover or select the backup interface for another reason, then ARP caches, routing tables and socket states do not need to be updated.

Instead of using a floating MAC address, a floating IP address could be used. In such cases, on failover, the server 102 broadcasts a message, such as a gratuitous ARP message, from the backup hardware interface 105 to announce that it currently owns the floating IP address. The message includes the burned-in MAC address associated with the backup hardware interface 105 and the floating IP address associated with the server 102. IP hosts and routers at the edge of the LAN 101 update IP-MAC address mappings in their ARP caches to associate the floating IP address with the MAC address associated with the backup hardware interface 105. Such updating of the ARP caches can be time-consuming which can lead to longer failover times. Furthermore, some devices cannot cope gracefully with changes in IP-MAC mappings. For example, high-scale Real-time Transport Protocol (RTP) media gateways cache MAC addresses on a per-RTP session basis and cannot cope with changing the MAC address during the session. In such cases, the RTP session may be dropped because the RTP data would not be sent to the failed-over backup hardware interface 105.

The sever 102 can thereby select between the primary and backup interfaces 104, 105 independently for data communication via VLAN A based on at least one characteristic of the ARP response messages received via VLAN A and for data communication via VLAN B based at least one characteristic of the ARP response messages received via VLAN B.

Figure 3:
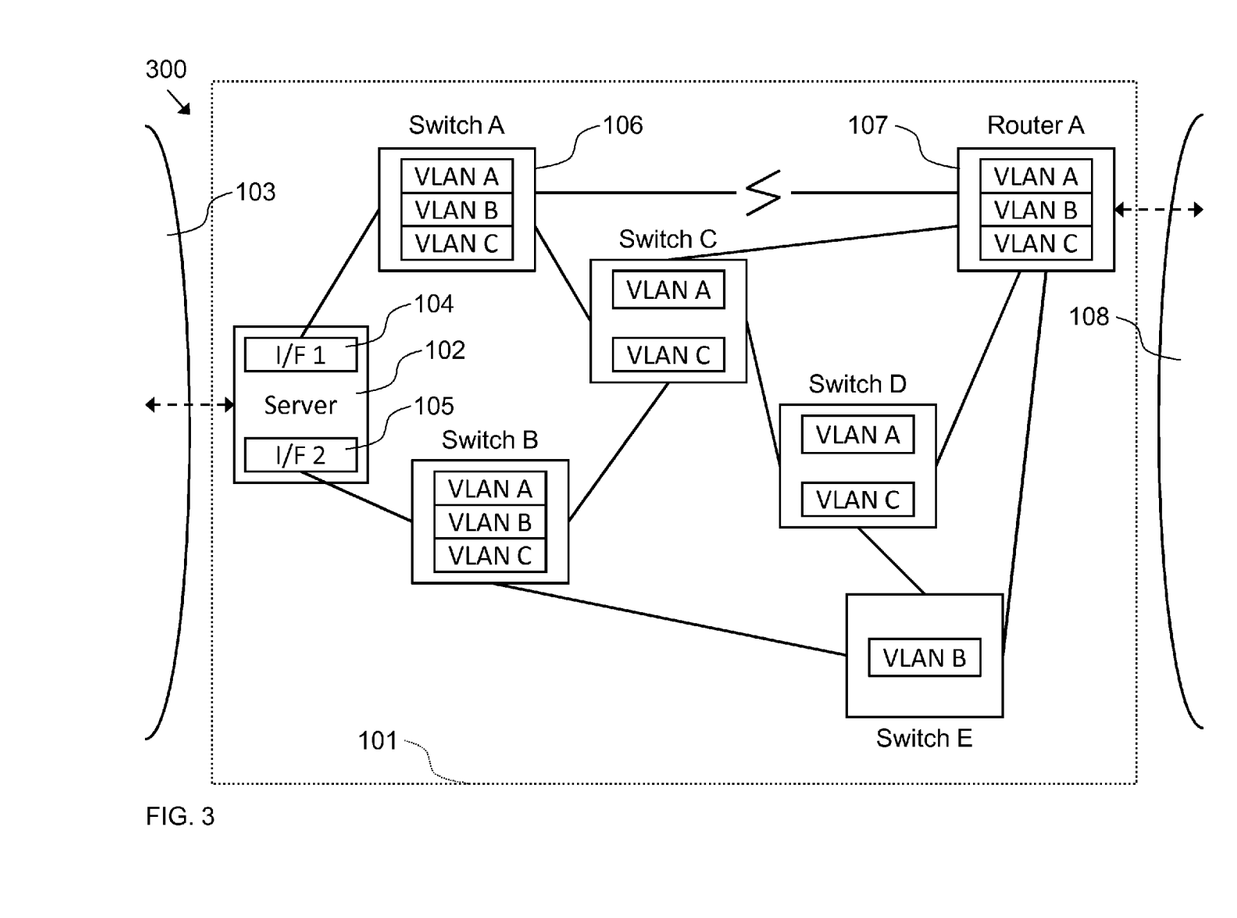
FIG. 3 is a schematic system diagram showing a network including a local area network according to some embodiments.

FIG. 3 is a schematic representation of a network 300 according to some embodiments.

FIG. 3 shows a third VLAN, VLAN C, which shares the same LAN 101 topology characteristics and hence failure modes as VLAN A. In this case, respective virtual interfaces associated with VLAN A and VLAN C can be grouped into a single redundancy group of virtual interfaces. A single virtual interface, for example the virtual interface associated with VLAN A, can be nominated as the leader of the redundancy group. It sends the ARP request messages on the primary and backup hardware interfaces 104, 105 on behalf of VLAN A. If replies to the ARP request message are received more reliably on one hardware interface 104, 105 than the other, then that hardware interface 104, 105 can be selected for both VLAN A and VLAN C because they share the same LAN topology. Even though only one virtual interface, in this case VLAN A, in the redundancy group is responsible for transmitting the ARP request messages for the redundancy group, all virtual interfaces in the group send promotion announcements on their respective VLANs in the event of a switchover.

The above embodiments are to be understood as illustrative examples of the invention. Further embodiments of the invention are envisaged.

For example, the explanation above can be extended to redundant server blade pairs in a blade server. In such cases, both the active blade and the standby server blades probe the LAN 101. However, only the active server blade uses the floating MAC address. Failover can then be performed not only internally on the active server blade but also to the standby server blade in the event of a failure associated with the active server blade.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling an apparatus in a local area network (LAN), the apparatus having a first hardware interface and a second hardware interface to connect to the LAN, the method comprising:

transmitting first monitoring request messages to one or more devices in a first virtual local area network (VLAN) via both the first and second hardware interfaces, and second monitoring request messages to one or more devices in a second VLAN via both the first and second hardware interfaces, wherein the first and second monitoring request messages use the Address Resolution Protocol (ARP) or the Neighbor Discovery Protocol (NDP);

receiving first monitoring response messages via the first and/or second hardware interfaces in response to the first monitoring request messages and second monitoring response messages via the first and/or second hardware interfaces in response to the second monitoring request messages;

selecting between the first and second hardware interfaces for performing data communication, based on the first and second monitoring response messages, wherein the selecting between the first and second interfaces is performed independently for data communication via the first VLAN based on at least one characteristic of the first monitoring response messages and for data communication via the second VLAN based at least one characteristic of the second monitoring response messages, and wherein the first hardware interface is configured with a first Media Access Control (MAC) address, the second hardware interface is configured with a second, different MAC address, and the first and second hardware interfaces are collectively associated with a third MAC address different from both the first and second MAC addresses, and wherein the method further comprises:

transmitting monitoring request messages, and receiving monitoring reply messages, using the first and second MAC addresses for both the first and second VLANs; and performing data communication using the third MAC address for each of the first and second VLANs.

2. The method according to claim 1, wherein at least some of the first and second monitoring request messages and at least some of the first and second monitoring response messages use the Address Resolution Protocol (ARP).

3. The method according to claim 1, wherein at least some of the first and second monitoring request messages and at least some of the first and second monitoring response messages use the Neighbor Discovery Protocol (NDP).

4. The method according to claim 1, wherein at least some of the first and second monitoring request messages are unicast messages.

5. The method according to claim 1, wherein at least some of the first and second monitoring request messages are transmitted to at least one common device.

6. The method according to claim 5, wherein the at least one common device comprises a default router for the LAN.

7. The method according to claim 1, wherein, whilst conducting data communication via at least one of the first and second VLANs using the first hardware interface, it is determined that the second hardware interface is more reliable than the first hardware interface for data communication via the at least one of the first and second VLANs, and wherein the method further comprises transmitting an announcement message via the second hardware interface announcing that the third MAC address is reachable via the second hardware interface and no longer via the first hardware interface for data communication via the at least one of the first and second VLANs.

8. The method according to claim 1, wherein a third VLAN shares the same topology in the local area network as the first VLAN, and wherein the method further comprises:

sending shared monitoring request messages and receiving shared monitoring response messages, on behalf of both the first VLAN and the third VLAN; and selecting between the first and second interfaces commonly for data communication via the first VLAN and data communication via the third VLAN, based on the shared response messages.

9. The method according to claim 1, further comprising determining whether the first hardware interface is more reliable than the second hardware interface for data communications via the first and second VLANs based on the first and second monitoring response messages, and performing the selecting on the basis of the determining.

10. A computer program product comprising a non-transitory computer-readable storage medium having computer readable instructions stored thereon, the computer readable instructions being executable by a computerized device to cause the computerized device to perform a method for controlling an apparatus in a local area network (LAN), the apparatus having a first hardware interface and a second hardware interface to connect to the LAN, the method comprising:

transmitting first monitoring request messages to one or more devices in a first virtual local area network (VLAN) via both the first and second hardware interfaces, and second monitoring request messages to one or more devices in a second VLAN via both the first and second hardware interfaces, wherein the first and second monitoring request messages use the Address Resolution Protocol (ARP) or the Neighbor Discovery Protocol (NDP);

receiving first monitoring response messages via the first and/or second hardware interfaces in response to the first monitoring request messages and second monitoring response messages via the first and/or second hardware interfaces in response to the second monitoring request messages;

selecting between the first and second hardware interfaces for performing data communication, based on the first and second monitoring response messages, wherein the selecting between the first and second interfaces is performed independently for data communication via the first VLAN based on at least one characteristic of the first monitoring response messages and for data communication via the second VLAN based at least one characteristic of the second monitoring response messages, wherein the first hardware interface is configured with a first Media Access Control (MAC) address, the second hardware interface is configured with a second, different MAC address, and the first and second hardware interfaces are collectively associated with a third MAC address different from both the first and second MAC addresses, and Wherein the method further comprises:

transmitting monitoring request messages, and receiving monitoring reply messages, using the first and second MAC addresses for both the first and second VLANs; and performing data communication using the third MAC address for each of the first and second VLANs.

11. An apparatus comprising a first hardware interface and a second hardware interface to connect to a Local Area Network (LAN), and the apparatus being configured to:

transmit first monitoring request messages to one or more devices in a first virtual local area network (VLAN) via both the first and second hardware interfaces, and second monitoring request messages to one or more devices in a second VLAN via both the first and second hardware interfaces, wherein the first and second monitoring request messages use the Address Resolution Protocol (ARP) or the Neighbor Discovery Protocol (NDP);

receive first monitoring response messages via the first and/or second hardware interfaces in response to the first monitoring request messages and second monitoring response messages via the first and/or second hardware interfaces in response to the second monitoring request messages;

select between the first and second hardware interfaces for performing data communication, based on the first and second monitoring response messages, wherein the selecting between the first and second interfaces is performed independently for data communication via the first VLAN based on at least one characteristic of the first monitoring response messages and for data communication via the second VLAN based at least one characteristic of the second monitoring response messages, wherein the first hardware interface is configured with a first Media Access Control (MAC) address, the second hardware interface is configured with a second, different MAC address, and the first and second hardware interfaces are collectively associated with a third MAC address different from both the first and second MAC addresses, and Wherein the apparatus is further configured to:

transmit monitoring request messages, and receiving monitoring reply messages, using, the first and second MAC addresses for both the first and second VLANs; and perform data communication using the third MAC address for each of the first and second VLANs.

12. The apparatus according to claim 11, wherein the apparatus comprises a media gateway.

13. The apparatus according to claim 11, wherein the apparatus comprises a session border controller.

* * * * *